(12) United States Patent
Torza

(10) Patent No.: US 7,592,894 B2
(45) Date of Patent: Sep. 22, 2009

(54) RECONFIGURABLE SWITCH HAVING AN OVERLAPPING CLOS ARCHITECTURE

(75) Inventor: Anthony Torza, Mountain View, CA (US)

(73) Assignee: Ciena Corporation, Linthicum, MD (US)

( * ) Notice: Subject to any disclaimer, the term of this patent is extended or adjusted under 35 U.S.C. 154(b) by 325 days.

(21) Appl. No.: 10/864,446

(22) Filed: Jun. 10, 2004

(65) Prior Publication Data

US 2005/0275504 A1     Dec. 15, 2005

(51) Int. Cl.
*H04Q 3/00*     (2006.01)
(52) U.S. Cl. .................... 340/2.22; 340/2.21; 340/2.25; 340/2.26; 340/2.27; 340/2.28; 340/2.6
(58) Field of Classification Search ................ 340/2.22, 340/2.21, 2.23, 2.24, 2.1, 2.25, 2.26, 2.27, 340/2.28, 2.6; 370/388, 386, 208, 395.2, 370/357, 358, 360, 362, 380; 379/265.02; 385/16
See application file for complete search history.

(56) References Cited

U.S. PATENT DOCUMENTS

| | | | |
|---|---|---|---|
| 5,093,824 A | 3/1992 | Coan et al. | |
| 5,390,178 A | 2/1995 | Hunter | |
| 5,463,486 A | 10/1995 | Stevens | |
| 5,471,332 A | 11/1995 | Shiragaki et al. | |
| 5,495,476 A | 2/1996 | Kumar | |
| 5,566,171 A | 10/1996 | Levinson | |
| 5,740,211 A | 4/1998 | Bedrosian | |
| 5,815,490 A | 9/1998 | Lu | |
| 5,825,517 A | 10/1998 | Antoniades et al. | |
| 5,864,552 A | 1/1999 | Du et al. | |
| 5,933,428 A * | 8/1999 | Olnowich | .................... 370/388 |
| 6,064,647 A | 5/2000 | Van Krevelen | |
| 6,208,667 B1 | 3/2001 | Caldara et al. | |
| 6,230,229 B1 | 5/2001 | Van Krevelen et al. | |
| 6,335,992 B1 * | 1/2002 | Bala et al. | ...................... 385/17 |
| 6,343,075 B1 | 1/2002 | Klausmeier et al. | |

(Continued)

FOREIGN PATENT DOCUMENTS

EP     0 844 755 A2     5/1998

(Continued)

OTHER PUBLICATIONS

Steinar Andresen, "The Looping Algorithm Extended to Base 2 Rearrangeable Switching Networks", IEEE Transactions on Communications, vol. Com-26, No. 10, Oct. 1977.

(Continued)

*Primary Examiner*—Vernal U Brown
(74) *Attorney, Agent, or Firm*—Clements Bernard PLLC; Christopher L. Bernard; Tyler S. Brown

(57) ABSTRACT

A data-communications switch having at least two modes of operation is provided. The data communications switch includes a first Clos switch having a first mode of operation and a second Clos switch, which is combined with the first Clos switch, for providing a second mode of operation. The first Clos switch and second Clos switch are interconnected in an overlapping manner to form a switch fabric, which is essentially a superset of both the first Clos switch and the second Clos switch and can be configured to operate in either mode depending on system requirements.

24 Claims, 10 Drawing Sheets

U.S. PATENT DOCUMENTS

| | | | |
|---|---|---|---|
| 6,714,537 B1 | 3/2004 | Adam et al. | |
| 6,810,412 B1 * | 10/2004 | Chang | 709/203 |
| 6,882,766 B1 * | 4/2005 | Corbalis et al. | 385/16 |
| 7,065,076 B1 * | 6/2006 | Nemazie | 370/388 |
| 2003/0091271 A1 * | 5/2003 | Dragone | 385/20 |

FOREIGN PATENT DOCUMENTS

| | | |
|---|---|---|
| WO | WO 99/33320 | 1/1999 |
| WO | WO 03/019975 * | 6/2003 |

OTHER PUBLICATIONS

J.Y. Hui, "Switching and Traffic Theory For Integrated Broadband Networks", Kluwer Academic Publishers, 1990, pp. 77-80.

* cited by examiner

RECONFIGURABLE SWITCH HAVING AN OVERLAPPING CLOS ARCHITECTURE

BACKGROUND OF THE INVENTION

Embodiments of the present invention generally relate to switches for data-communication networks, and more specifically, to switches for telecommunication networks being reconfigurable to operate in a plurality of modes.

Telecommunication switches are typically utilized in networks for directing data through circuits which comprise the network. Switches normally have a plurality of inputs and a corresponding number of outputs, so data entering any input line may be routed to any output line. Ideally, the switching function would be performed with one single monolithic integrated circuit, having all the inputs in one side, and all the outputs on the other side. This would permit centralized control for information access and selecting the appropriate input stream for the appropriate output stream. However, the monolithic integrated circuit approach is not realizable given the current limits of semiconductor fabrication technology and desirable switch size.

Once practical solution this problem is to distribute the switching function amongst an assembly of multiple switching chips, and referring to this assembly as a switch or a switching device within the switching fabric. In order to adequately function, connections must exist from every valid input to every valid output of the switching fabric. One distributed switch architecture which is utilized widely is today is called the "Clos Architecture," developed by Charles Clos in 1953. This architecture, also known as the Clos switch, may be realized as a multistage, non-blocking network which has the advantage of reduced cost and complexity associated with other switches, such as the traditional crossbar switch.

A typical logical diagram of a Clos switch is a three-stage switch having inputs (ingress traffic) and outputs (egress traffic) as shown in FIG. 1. The first stage is divided into plurality of ingress switches, the second stage is plurality of center switches, and the third stage is plurality of output switches. Each stage contains one or more switching chips, and the sum total these chips produces the switching fabric which allows the direction of data from one input chip to a central stage chip to the appropriate output chip. The ingress and egress switches may be packaged into a plurality (Y) of ingress line modules 110 (LMs) and egress 120 LMs, while the center switches are packaged into a plurality (Z) of switch modules 115 (SMs). One of ordinary skill in the art would appreciate that the separate line modules shown in FIG. 1 are not necessarily physically distinct devices, and distinct modules are delineated merely as a function of their logical operation. The distinct functionally performed by ingress LMs 110 and egress LMs 120 may be realized on a single piece of hardware configured to operate in either (or more likely, both) mode(s), depending on the direction of the flow of data. Moreover, as shown in FIG. 1, LMs 110, 120 and SMs 115 are collectively divided into two vertical groups only for comparison with embodiments of the invention presented below.

Each ingress line module 110 should have at least one logical link to each switch module 115, and each egress line module 120 should have at least one logical link to each switch module 115. By logical link, it is meant that an information path exists between two devices so that the two devices can send and/or receive communications to and/or from each other. As used herein, the term "link" is used to refer to a physical link, such as a fiber optic line. Note that a physical link need not be equivalent to a logical link. For example, a physical link may comprise a plurality of logical links and/or a plurality of physical links may comprise a logical link.

Further referring to FIG. 1, ingress traffic, typically coming over one or more links such as fiber optic cables, enters ingress line modules 110. Line and section overhead data may be terminated at this point, and path overhead data may pass through ingress line module 110 as part of the data stream. Traffic may enter and proceed through ingress line modules 110, and travel across a plurality of logical links, each denoted as n1, to switch modules 115 (which may contain one or more switching chips). These logical links are realized as (physical) links which are formed on the backplane (not shown) supporting the switch fabric, and each logical link n1 depicted as a single line may consist of one or more links. From SM 115, traffic travels across n1 logical links through each egress LM 120, and then may exit through another link, such as, for example, one or more fiber optic cables.

Further referring to FIG. 1, because each of ingress LM 110 may be connected to SM 115, and each SM 115 may in turn be symmetrically connected to egress LM 120, a full complement of center stage switches may be needed in order for a large switching device to operate with full line module bandwidth. In other words, in order to properly make enough connections between all of the inputs and outputs to transport the data supplied by all the ports on each LM, the full complement of center stage switches may be needed in order to create a valid network for passing traffic. This condition may present limitations (such as undesirably high cost) in some low port-count applications when only a few input/output ports are required. As used herein, a port may be an external interface between a line module and a link used to transport data to and from the switch 100.

Typically, it is desirable to utilize common hardware whenever possible when realizing a network. Such benefits as reduced overall cost, streamlined maintenance and training, and higher system reliability are associated with hardware standardization. A customer desiring the benefits of standardizing switching equipment would have to purchase a full complement of center stage switches, even if the networking application is a low bandwidth one which may only using one or two line modules. Thus, an unnecessary additional expense is incurred by purchasing common equipment which may be underutilized for the low-bandwidth application.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION OF THE EMBODIMENTS

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not require a direct physical connection.

Figure 1:
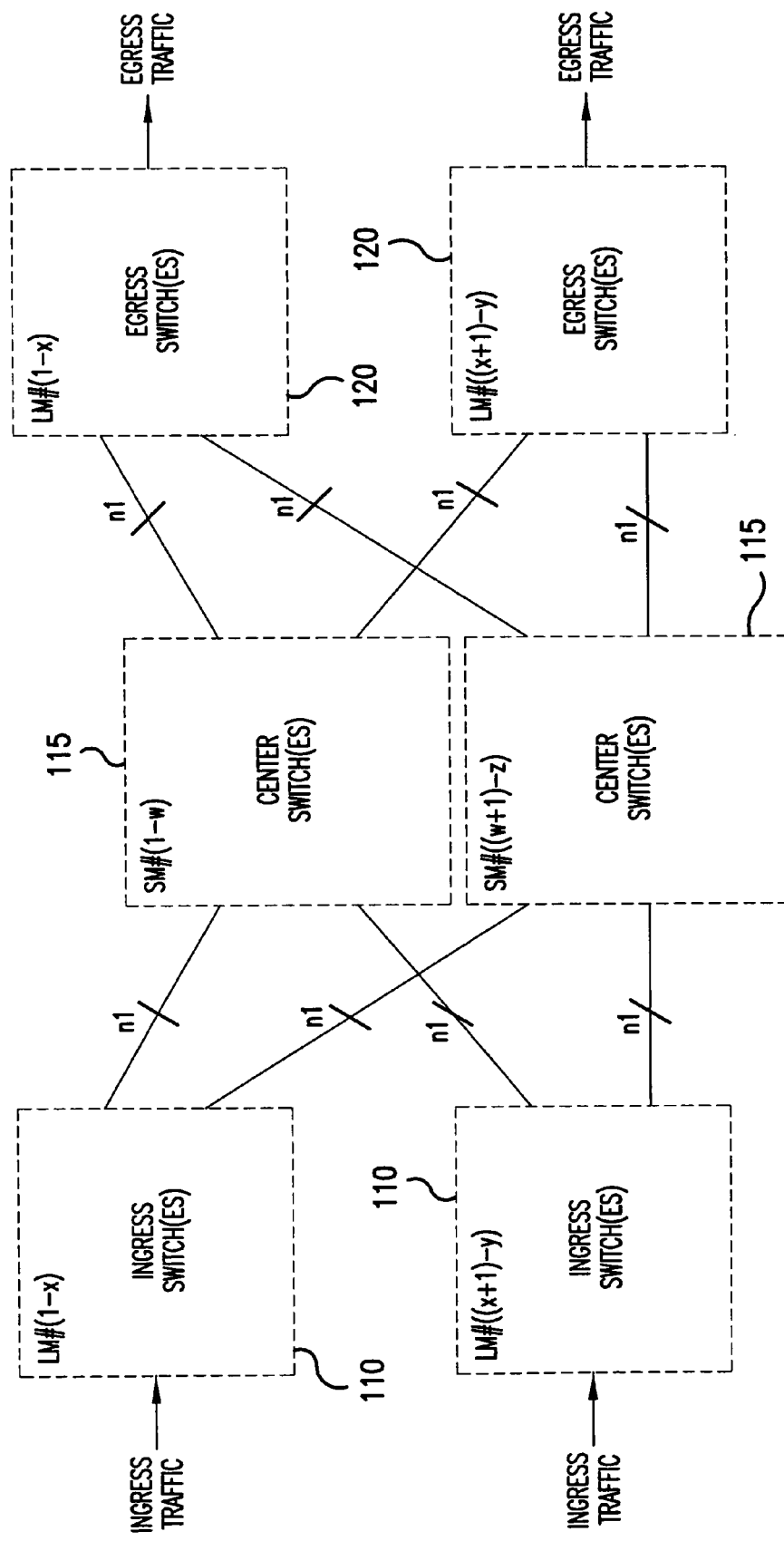
FIG. 1 shows an exemplary logical diagram of a conventional Clos switch.

Clos switches as depicted in FIG. 1 may be grouped together to form large switching devices for routing signals for large metropolitan areas. These switching devices may work at optical wavelengths and/or sub wavelength levels (e.g., STS-1; however, embodiments of the invention are not limited to SONET or the STS-1 framesize, and may be compatible with other networking standards, such as, for example, SDH (Synchronous Digital Hierarchy) which in turn may utilize STM frames), and form the core optical switch for a nationwide or global networks.

Figure 2:
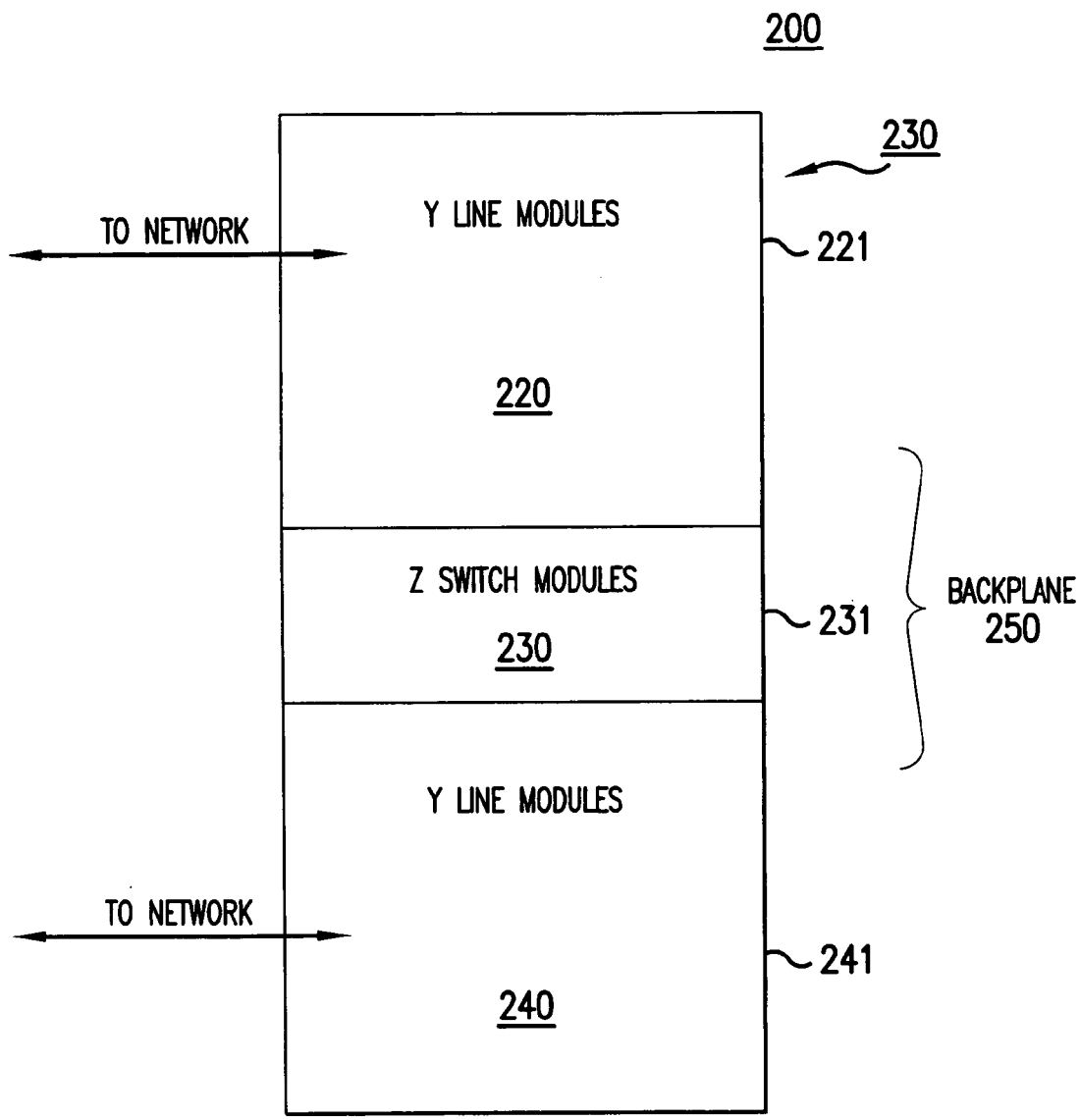
FIG. 2 shows a top level diagram of illustrating a chassis consistent with embodiments of the invention.

FIG. 2 depicts a top level diagram showing switching equipment 200, consistent with the embodiments of the present invention. Switching equipment 200 may include a single chassis having a number of connected shelves, 221, 231, 241, which may accept line cards having Line Modules (LMs) 220, Switch Modules (SMs) 230, and Line Modules (LMs) 240, respectively. Alternatively switching equipment 200 may include a plurality of chassis and/or sub chassis.

Each set of LMs 220 and 240 may be operatively connected to a network, typically through a fiber optic cable, to send and receive data traffic. Data shared between any LMs, regardless of location, flows through SMs 230 over a backplane 250. In one embodiment, there may be 32 slots for LMs 220 and LMs 240, each of which may support 80 Gigabits/sec of data traffic, entering the system from several links, such as optical cables operatively coupled to the LMs. As used herein, a backplane may be a physical surface providing interconnections between electrical and/or optical circuits and subsystems coupled thereto. While the description for FIG. 2 above only describes the use of one backplane, one of ordinary skill in the art would appreciate that utilizing a plurality of backplanes (connected via optical or electrical cabling) may be consistent with embodiments of the invention.

According to principles consistent with embodiments of the invention, the switching fabric in switching equipment 200 may, in general, be implemented as multiple, parallel switching networks having an overlapping structure. As used herein, the term "overlap" may refer to a switching fabric supporting any number of different logical models, each having different attributes, while utilizing common hardware in an efficient manner. A fuller understanding of the term "overlap" as it is used herein will be gained by a complete reading of this invention description.

For example, an embodiment of the invention may have an overlapping switching fabric which supports two different logical models. One model may operate in a high bandwidth mode, and the other model operates in a low bandwidth mode. The high bandwidth model may support the maximum number of LMs at full capacity. The low bandwidth model may support a smaller number of LMs at full capacity with less common equipment. The low bandwidth model may add approximately 10% to the total system resources (e.g., the backplane traces and switching chips), but reuses many of the resources in the high bandwidth model. This reuse, or overlapping use of resources allows the low-bandwidth mode with minimal additional system cost and complexity.

With reference to FIG. 2, the switching fabric in switching equipment 200 may be implemented as two, parallel switching networks which may overlap each other. The first switching network, having a lower aggregate bandwidth, may support a smaller number of input/output LMs (and hence a smaller number of ports) and may also have a smaller number of center stage switches. The second switching network may have a higher aggregate bandwidth and can support the full complement of LMs and a full complement of center stage switches. The lower bandwidth switching network would reduce the cost of switch 200 given the reduction of common hardware components. Moreover, by utilizing common hardware components for two different modes of operation, both the initial cost of an entire network and ongoing maintenance costs may be reduced.

Another advantage to embodiments of the invention is that both low and high bandwidth modes may be realized in same set of chassis of switching equipment 200. The low bandwidth mode can be easily upgraded to the high bandwidth mode by adding more common hardware to switching equipment 200 and changing a logical software model of which configures the switch fabric of switching equipment 200.

Figure 3:
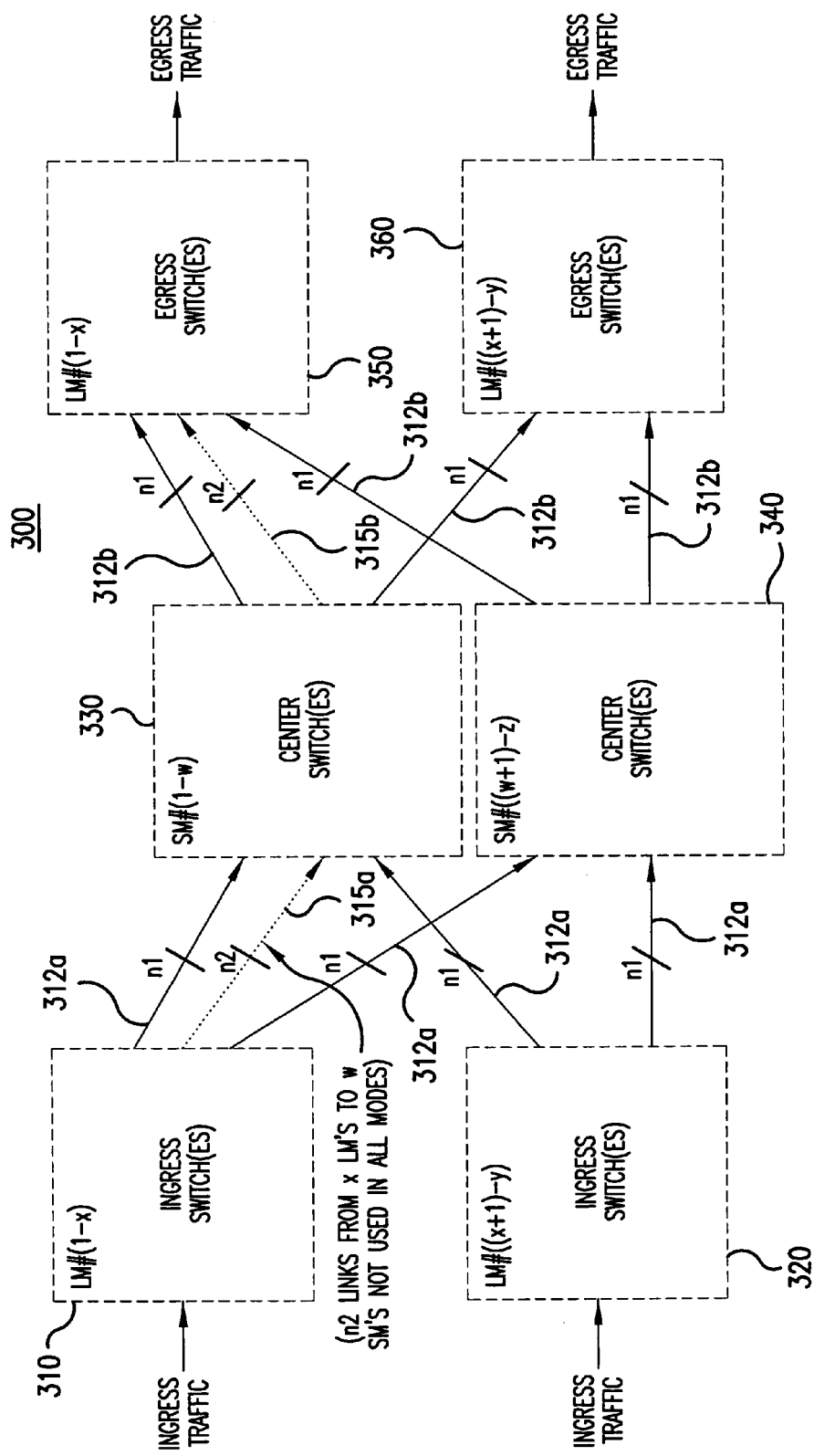
FIG. 3 shows an exemplary logical diagram of a generic Clos switch consistent with embodiments of the invention.

FIG. 3 shows an exemplary logical diagram of a generic Clos switch consistent with embodiments of the invention. Generic switch 300 shows both Clos switches associated with both low and high bandwidth operation, and is presented for comparison with standard Clos switch shown in FIG. 1. It is important to note that FIG. 3 only shows one embodiment of the invention which has two overlapping switches providing two modes of operation, one mode having low bandwidth communication and one mode having high bandwidth communication. Note that this invention is not limited to supporting two modes of operation (e.g. low and high bandwidth modes)—it is entirely consistent with this invention to design a system which supports several different modes of operation.

Generic switch 300 looks similar to traditional Clos switch 100 shown in FIG. 1, with the exception of an additional two groups of logical links (n2), 315*a* and 315*b*, depicted with dashed lines. However, in general, if multiple overlapping Clos switches are used to provide multiple modes of operation, there may be a corresponding increase in the number of additional groups of logical links (n2, n3, n4 . . . ), wherein this number corresponds directly to the number of modes.

Further referring to FIG. 3, a first set of LMs 310, are denoted #(1–X), may be connected to SMs 330, denoted SM #(1–W) via additional n2 logical links 315*a* and 315*b*. n1 logical links 312*a* and 312*b*, configured as shown in FIG. 3, remain essentially the same as in traditional Clos switch 100 shown in FIG. 1. A primary functional difference between traditional Clos switch 100 and generic Clos switch 300 may be the addition of n2 logical link 315a between LMs 310 and SMs 330 and n2 logical link 315b between SMs 330 and LMs 350. These extra n2 logical links 315a and 315b may not be used in all cases, but only for low-bandwidth operation. Additionally, n2 logical links 315a and 315b enable this new functional model, that is, it allows the switch to look like one of two different models of the switch depending on how many SMs 330 and 340 are used and how many LMs 310, 320, 350, 360 are used.

As described above for FIG. 1, one of ordinary skill in the art would appreciate that the separate line modules shown in FIG. 3 are not necessarily physically distinct devices, and distinct modules are shown merely as a function of their logical operation. The distinct functionally performed by ingress LMs 310 and 320, and egress LMs 350 and 360, may be realized on the same line module (i.e., on a single piece of hardware) configured to operate in each mode, depending on the direction of the flow of data. Therefore, LM 310 may be the same module as LM 350, and LM 320 and LM 360 may also be linked.

Figure 4:
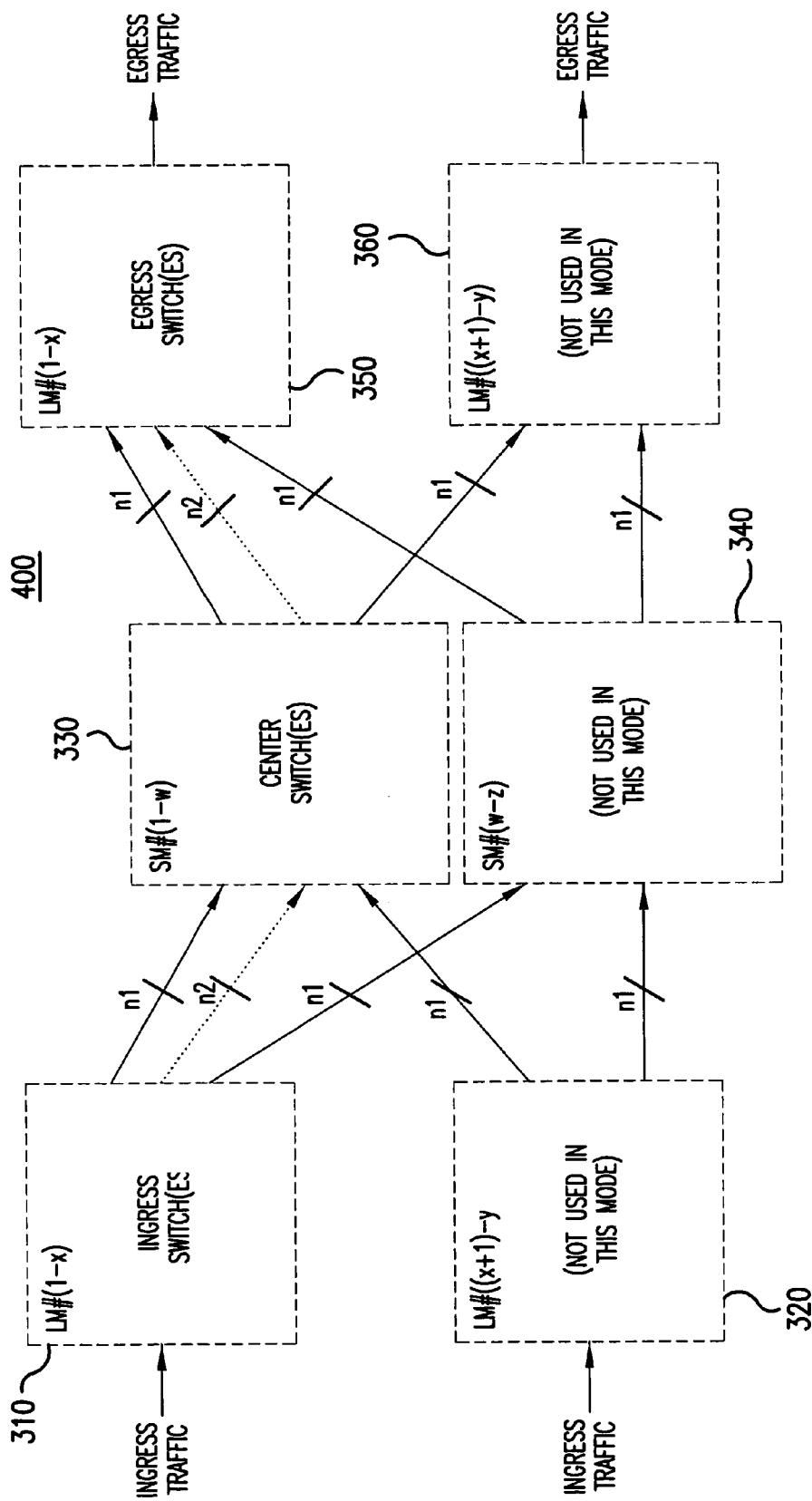
FIG. 4 shows a logical diagram of an overlapping Clos switch used for low-bandwidth operation consistent with embodiments of the invention.

FIG. 4 shows a logical diagram of the Clos switch used for low-bandwidth operation consistent with embodiments of the invention. Low bandwidth Clos switch 400 may only accept ingress data into first set of ingress LMs 310. Data traffic may then be provided from LMs 310 to a first set of SMs 330 over logical links n1 and n2. Data may subsequently be passed from SMs 330, over logical links n1 and n2, to egress LMs 350, and ultimately the egress traffic may be passed outside switch 400. Ingress LMs 320, SMs 340, and egress LMs 360 may not be used in the low bandwidth mode, and are thus shown in FIG. 4 with shading. This mode allows switching equipment 200 to operate with a smaller number of switch modules and line modules while utilizing common hardware with switches operating in the higher bandwidth mode. Under smaller loads, switch configuration 400 enables operation using a smaller number of switch modules (SMs), W in this case, at a higher capacity with a smaller number of LMs (up to X in this case), thus permitting a lower cost per port for initial (low bandwidth) deployments.

Figure 5:
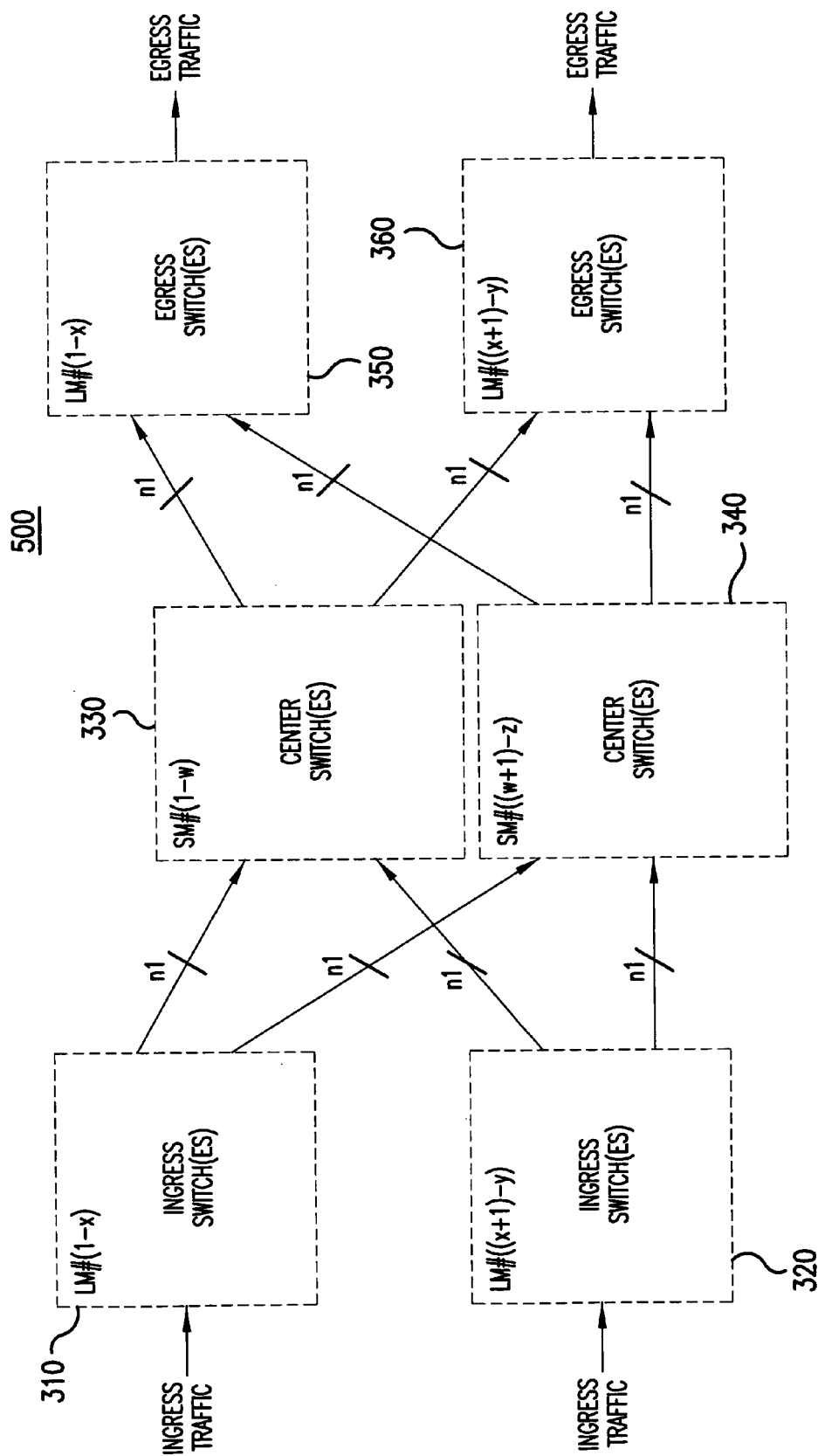
FIG. 5 shows a logical diagram of the Clos switch used for high-bandwidth operation consistent with embodiments of the invention.

FIG. 5 shows a logical diagram of the Clos switch used for high-bandwidth operation consistent with embodiments of the invention. High-bandwidth Clos switch 500 may accept ingress data into first set of ingress LMs 310 and second set of ingress LMs 320. Data traffic may then be provided from ingress LMs 310 and 320 to both first set of SMs 330 and a second set of SMs 340 over logical links n1. Data may then be transferred from SMs 330 and 340 to a first set of egress LMs 350 and a second set of egress LMs 360, and ultimately, may then be transferred outside switch 500 as egress traffic. It should be understood that for this operational mode, logical links n2 may not be configured to carry traffic in high bandwidth mode. When changing operation from the low bandwidth mode to the high bandwidth mode, data traffic may be rolled off logical links n2 onto logical links n1.

Figure 6:
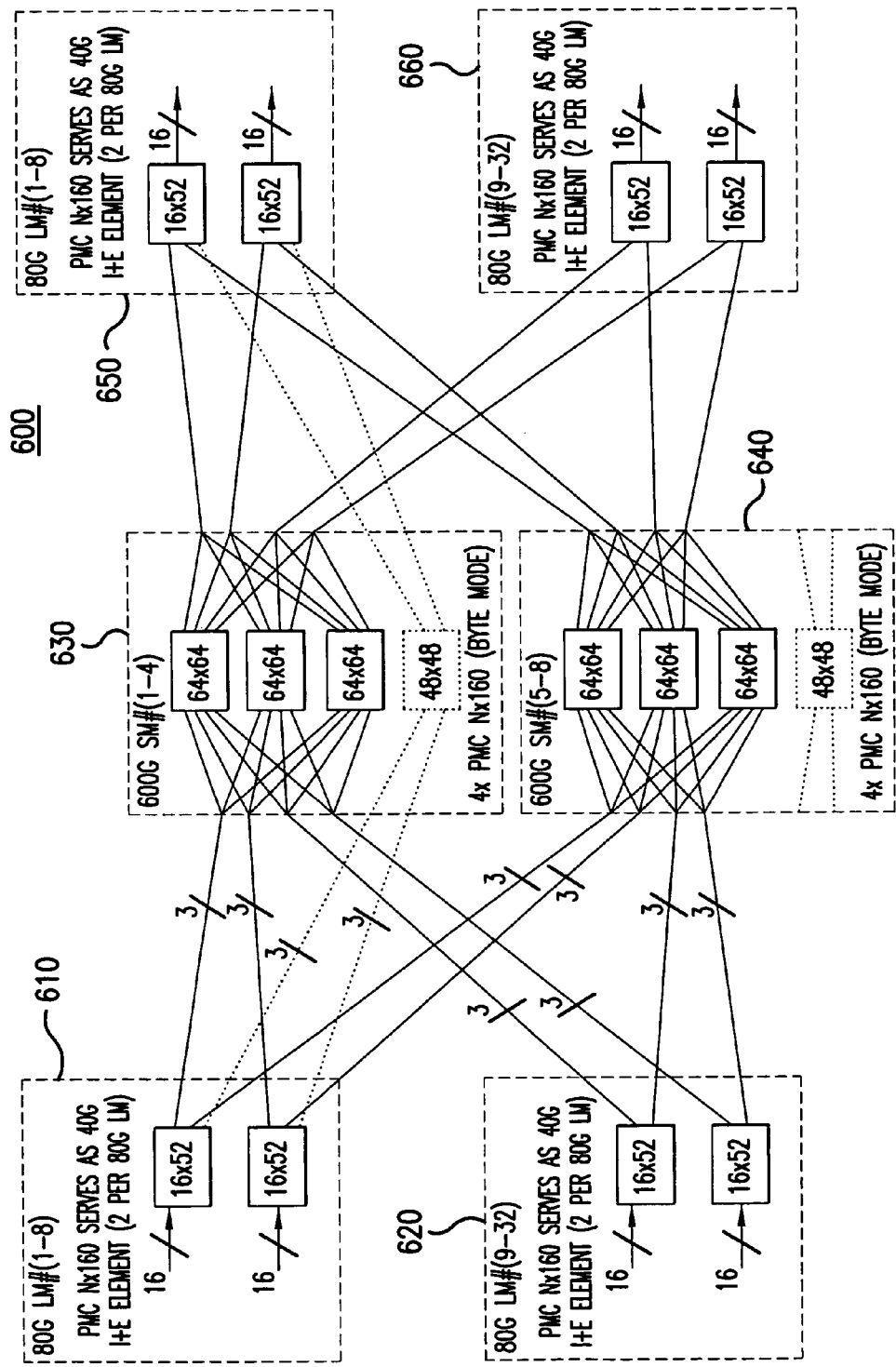
FIG. 6 shows another exemplary logical diagram of a generic Clos switch consistent with another embodiment of the invention.

FIG. 6 shows another exemplary implementation of a generic Clos switch consistent with an embodiment of the invention. Clos switch 600 is a generic diagram showing both low and high bandwidth modes of operation. This diagram depicts the types and interconnects of switches in all of the LMs and SMs. A first set of ingress LMs 610, and a first set of egress LMs 650, may each have 8 individual LMs having a bandwidth of 80 Gbps each. Each line module in LMs 610 and 650 contain two switch chips, each having 52 inputs and 52 outputs. Note that these chips have two modes of operation—one mode as an ingress chip, and one mode as an egress chip. This implies that each chip uses 36+16 inputs and 16+36 outputs, for a total size of 52 inputs and 52 outputs. These chips may be, for example, the PMC Nx160 which are made by PMC Sierra. A second set of ingress LMs 620, and second set of egress LMs 660, may each have 24 individual LMs each having a bandwidth of 80 Gbps. Each line module in LMs 620 and 650 contain two switch chips, each having 52 inputs and 52 outputs. These chips may be the same as the chips used in LMs 610 and 620. A first set of SMs 630 and a second set of SMs 640, each may have 4 SMs, and each SM may have 4 chip switches, 3 of which have 64 inputs and 64 outputs, and 1 having 48 inputs and 48 outputs. These chips are also PMC Nx160 chips made by PMC Sierra. Each switch module in SMs 630 and 640 has 600 Gbps of bandwidth.

Further referring to FIG. 6, in low bandwidth mode, only the first ingress LMs 610, first SMs 630, and first egress LMs 650 are utilized. The dotted lines are used in this mode from LMs 610 to SMs 630. Therefore chips having the connectivity of the dotted lines from those switch chips with LMs 610 to the SMs 630 may only be utilized in 4 of the switch modules slots that support the connectivity across the back plane. The other four SMs (5-8) do not require that connectivity, although it is possible to use the same equipment in those slots. In this embodiment, the logical links fan out so there are three links that pass from each line module to each switch module. At the SMs 630, the interconnects have been drawn so that each one connection at that point can be seen, so there is one connection from each ingress switch to each center switch, which fans out from there. This explains why n1 equals 1 at that point, because each center switch chip has one connection to each ingress switch. In the low bandwidth mode, only line modules in slots 1 up to 8 may be populated as indicated by LMs 610. In the first set of SMs 630, all four switch modules could be used, with the 48×48 switch connected by the n2 logical links as indicated by the dotted lines. In the full capacity mode, the logical links represented by the dotted lines may not be used, therefore switch modules 1-8 and line modules 1 up to 32 may be used. Additionally, second set of SMs 640 could be added to the circuit.

Figure 6A:
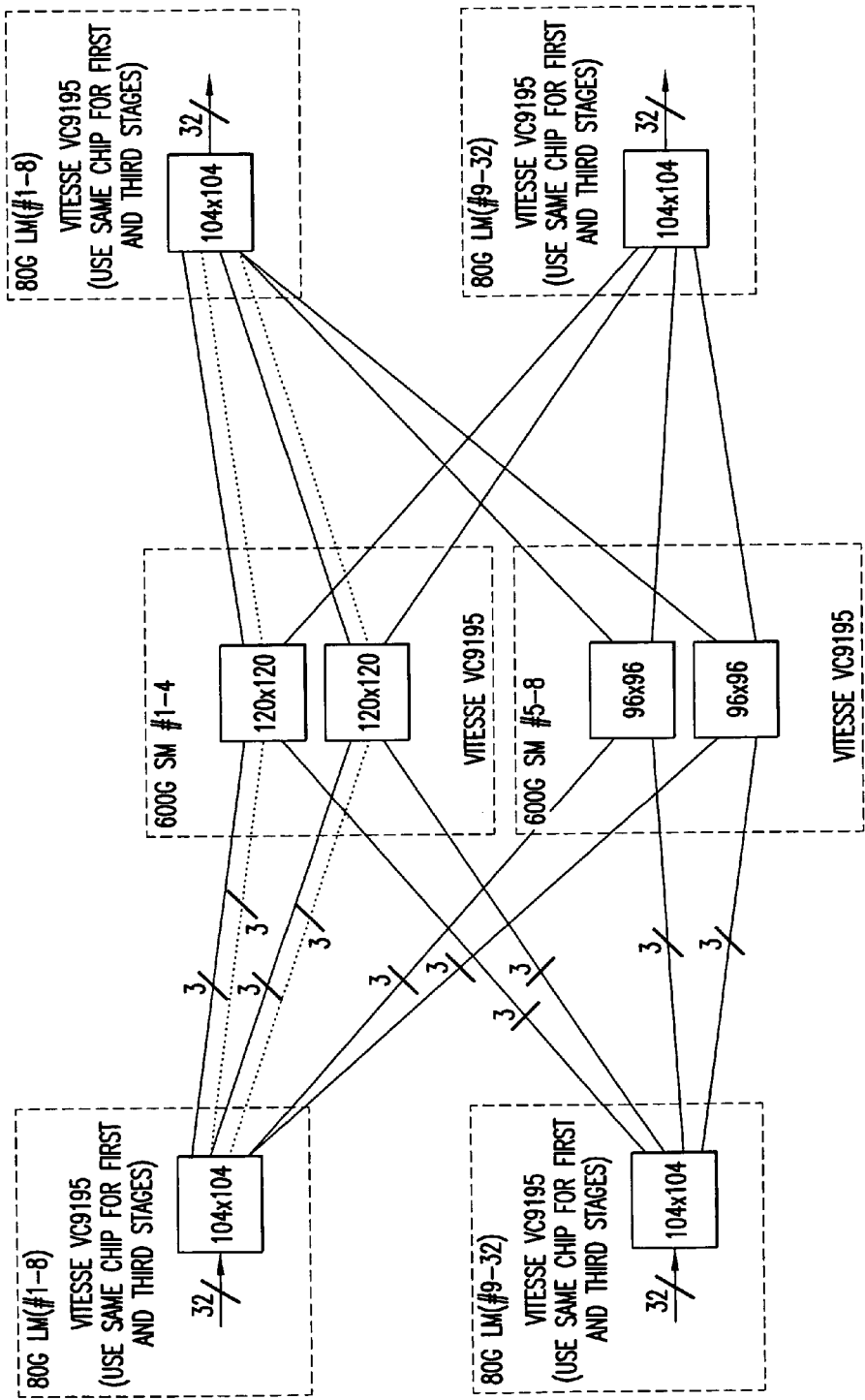
FIG. 6A shows yet another exemplary implementation of a generic Clos switch consistent with an embodiment of the invention.

FIG. 6A shows yet another exemplary implementation of a generic Clos switch consistent with an embodiment of the invention. This embodiment may utilize larger switch chips in the line modules and switch modules for each mode of operation. Each module in the switch may utilize a soon-to-be-available Vitesse VC9195 switch chip, having a larger switching capacity (up to 128 inputs and 128 outputs @ 2.5G per chip). Because the same type of switch chip may be used in all of the line and switch modules, this embodiment enables reuse of the same switch chips for the low bandwidth mode, instead of using a different switch chip as shown in the previous embodiment. The larger switch chip allows the ingress and egress switching function to be performed with a chip enclosed in a single package.

Figure 7:
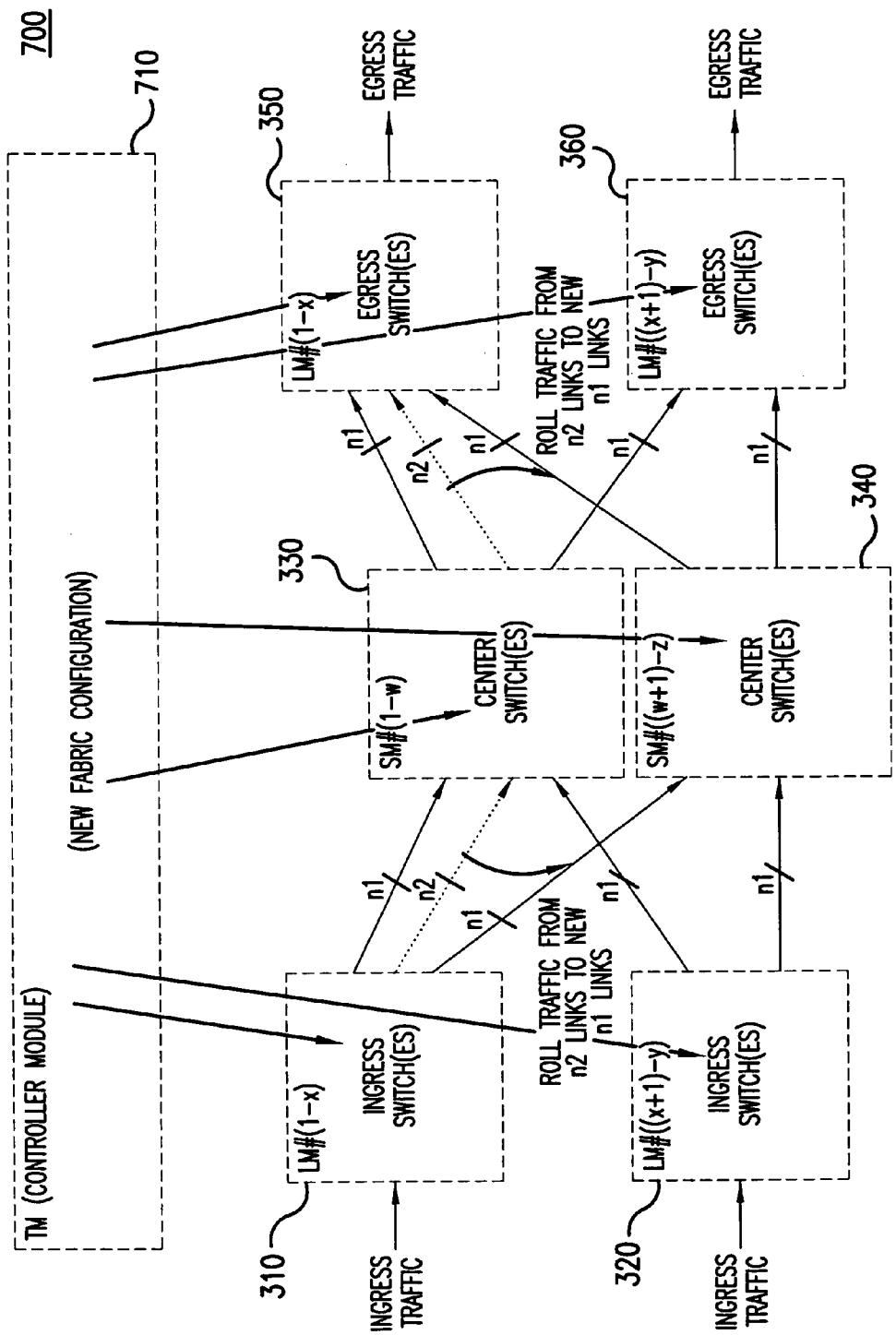
FIG. 7 shows switch fabric being reconfigured by a controller module consistent with embodiments of the invention.

FIG. 7 shows switch fabric being reconfigured by a controller module consistent with embodiments of the invention. A card 710 in switch 700 may control the switch chips residing in the LMs and the SMs. When traffic needs to change and the traffic patterns to the switch need to change, a controller module 710 may change the connections across the different stages. When going from the low to high bandwidth mode, extra switch modules may simply be added, that is, the extra #((W+1) to Z) SMs 340. A new fabric configuration may be download which rolls traffic from the n2 logical links to the new n1 logical links, as indicated by the bold arrow in FIG. 7. This allows an upgrade path which provides the ability to change operational modes of the switch while minimizing the affecting on existing traffic. Once the controller 710 initiates mode change, the n2 logical links are no longer used and the switch operates in high bandwidth mode.

Figure 8:
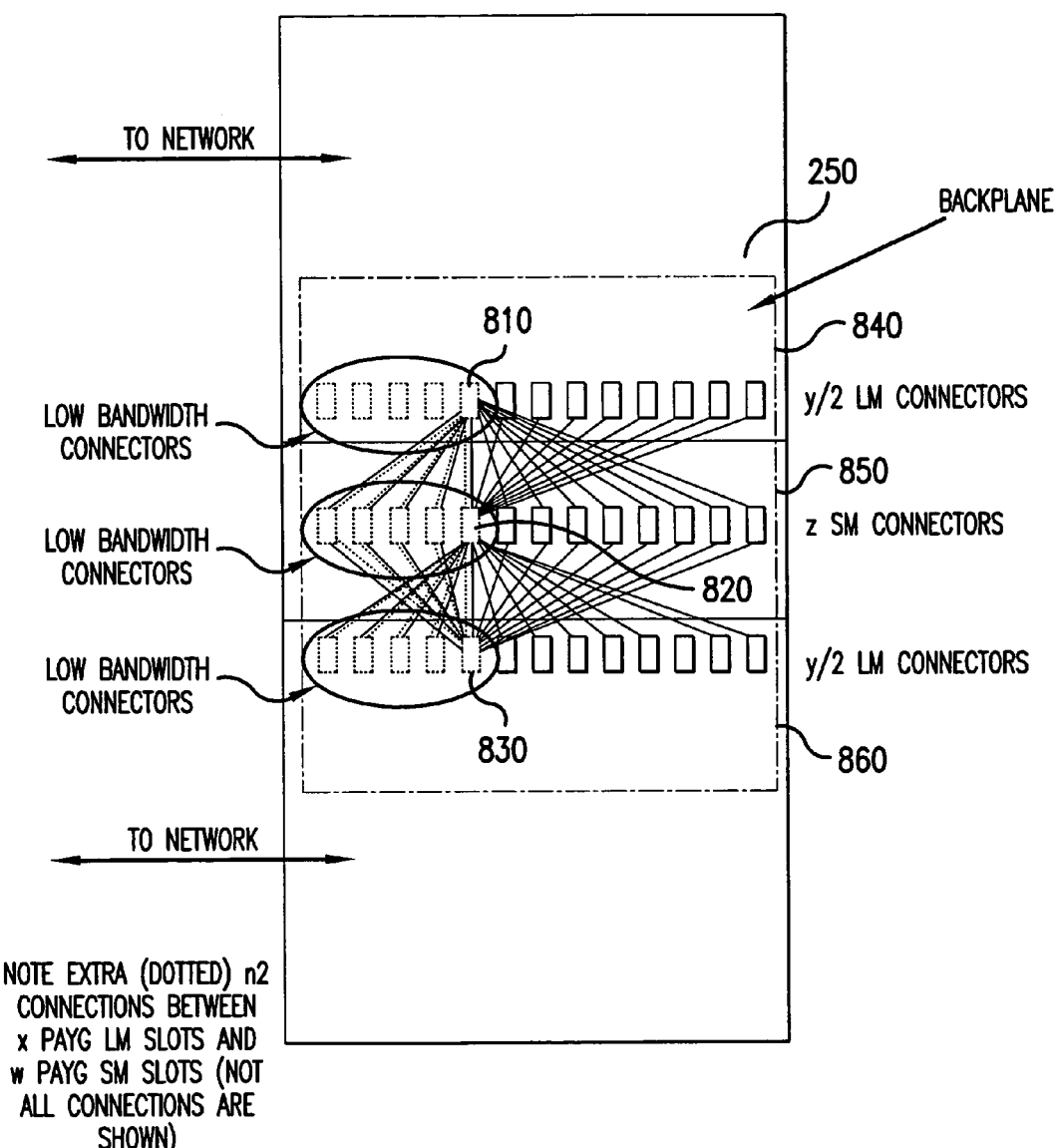
FIG. 8 shows interconnections on an exemplary backplane consistent with embodiments of the invention.

FIG. 8 shows interconnections on an exemplary backplane consistent with embodiments of the invention. Switch 200 may be implemented utilizing a single backplane 250 to support three shelves of hardware contained in chassis 230. Shelves 840 and 860 may support LMs, and shelf 850 may support SMs. Shelf 840 and 860 each may support x/2 of the "low bandwidth" LM slots to ease backplane routing restrictions. The full backplane connectivity is not shown in this diagram. Instead, LM 810 connects via n1 links (depicted using a solid line) to each SM, and via n2 links (depicted using a dotted line) to the first w SMs (similarly, LM 830 in shelf 860 may have the same connectivity). Each of the first w SMs in turn (e.g. SM 820) connects to each LM in both shelves via n1 (solid) links and to the first x LMs via n2 (dotted) links. Note that each line on the diagram represents a bidirectional link that carries both ingress and egress traffic.

Figure 9:
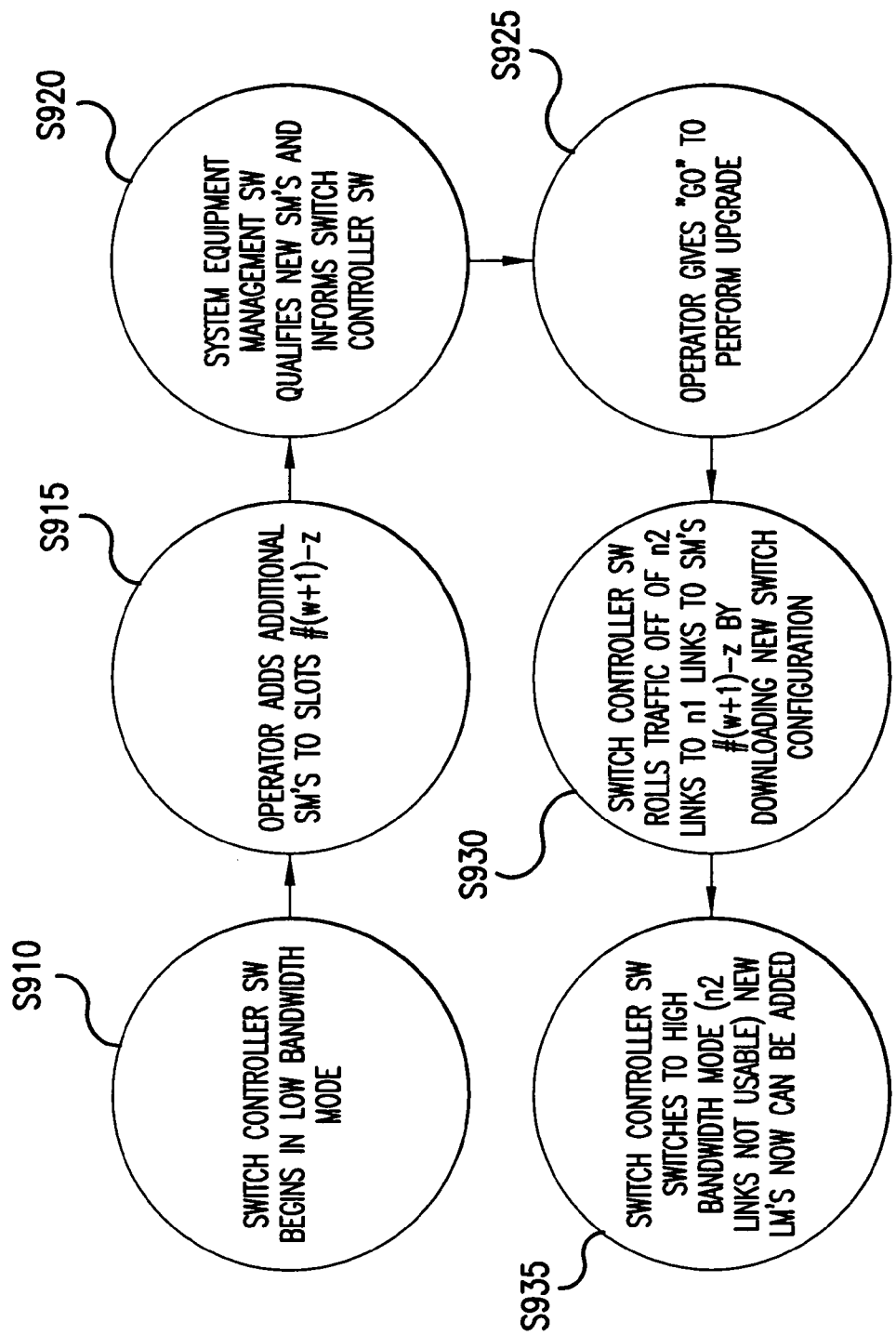
FIG. 9 shows a software-based signal flow chart consistent with an exemplary embodiment of the invention.

FIG. 9 depicts a software-based signal flow chart consistent with an exemplary embodiment of the invention. A system can be upgraded from low bandwidth mode to high bandwidth mode as the bandwidth needs of the network node increase. The procedure for this may be relatively simple. The system starts in the low-bandwidth mode state. (Step 910) The operator may then add the new common equipment (SM's to slots #((w+1) through z). (Step 915) The equipment management software may then qualify the modules to make sure they are fully operational and inform the switch controller software of their availability. (Step 920) When all the new hardware has been added, the operator may manually give the command to upgrade the software model from the low bandwidth to the high bandwidth model of the switch. (Step 925) After this command is received by the switch controller 710, the switch controller software may automatically calculate a new switch configuration to route all traffic previously traversing the switch on n2 links onto the hitherto unused n1 links to SMs #((w+1) through z). (Step 930) Finally, the switch controller software will autonomously switch the internal switch model to the high bandwidth model. (Step 935) This may consist of passing the parameters C (number of center stage switches, previously w*(#chips per SM in low bandwidth mode), now z*(#chips per SM in high bandwidth mode)) and N (number of links to each switch) to the switch controller, so that it can perform its calculation. The switch controller may also be informed that LMs in slots (x+1) to z can be used to carry traffic. From this point further, the switch controller will no longer use the n2 links to route traffic through the fabric now that it is in high bandwidth mode.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of operating a data-communications switch in two modes of operation, comprising:

operating a first Clos switch in a first mode of operation with a first set of hardware, wherein the first Clos switch comprises overlapping logical links used only in the first mode of operation;

combining a second Clos switch with the first Clos switch in an overlapping structure to form a switch fabric which is a superset of the first and second Clos switches for providing a second mode of operation, wherein the second Clos switch comprises logical links configured to receive traffic from the overlapping logical links on the first Clos switch in the second mode of operation, and wherein combining comprises adding a second set of hardware to the first set of hardware without impacting traffic on the first set of hardware; and upgrading from the first mode of operation to the second mode of operation with minimal effect of traffic on the first Clos switch, wherein minimal effect comprises an in-service switch between the first Clos switch and the second Clos switch, wherein upgrading comprises rolling traffic from the overlapping logical links on the first Clos switch to the second Clos switch, and wherein the overlapping logical links on the first Clos switch are not used in the second mode of operation following upgrading;

wherein the first mode of operation operates with reduced aggregate bandwidth from the second mode of operation.

2. The method of operating a data-communications switch according to claim 1, wherein the first Clos switch and the second Clos switch are three-stage Clos switches.

3. The method of operating a data-communications switch according to claim 1, wherein the first and second Clos switches comprise common hardware configured to operate in both the first mode of operation and the second mode of operation.

4. The method of operating a data-communications switch according to claim 1, wherein first Clos switch individually operates at a first capacity, and the second Clos switch is combined with the first Clos switch, so that the combined Clos switch operates at a capacity greater than the first capacity.

5. The method of operating a data-communications switch according to claim 4, wherein the second Clos switch may be added to the first Clos switch by utilizing pre-existing interconnections and controller software.

6. A method of operating a reconfigurable switch used in data communication, comprising:

operating a first Clos switch in a low-bandwidth mode with a first set of hardware, wherein the first Clos switch comprises:

a first set of ingress line modules having a plurality of inputs and a plurality of outputs;

a first set of switch modules having a plurality of inputs and a plurality of outputs comprising overlapping logical links used only in the low-bandwidth mode, each first switch module input being respectively coupled to one of the plurality of ingress line module outputs; and a first set of egress line modules having a plurality of inputs and a plurality of outputs, wherein each first egress line module input is respectively coupled to one of the plurality of switch module outputs;

adding a second Clos switch to the first Clos switch to form a composite Clos switch, wherein the second Clos switch is added to the first Clos switch while the first Clos switch is operating, and wherein adding comprises adding a second set of hardware to the first set of hardware without impacting traffic on the first set of hardware;

upgrading from the low-bandwidth mode to a high-bandwidth mode with minimal effect of traffic on the first Clos switch, wherein upgrading comprises rolling traffic from the overlapping logical links to logical links on the second Clos switch, and wherein minimal effect comprises an in-service switch between the first Clos switch and the second Clos switch, and wherein the overlapping logical links are not used in the low-bandwidth mode following upgrading; and operating the composite Clos switch in the high-bandwidth mode, wherein the composite Clos switch comprises:
the first set of ingress line modules and a second set of ingress line modules, each set having a plurality of inputs and a plurality of outputs;
the first set of switch modules and a second set of switch modules, each having a plurality of inputs and a plurality of outputs, each input from first and second set of switch modules being respectively coupled to one of the plurality of the first and second set of ingress line module outputs; and
the first set of egress line modules and a second set of egress line modules, each having a plurality inputs and outputs, wherein each input from the first and second set of egress line modules being respectively coupled to one of the plurality of the first and second set switch module outputs;
wherein the low-bandwidth mode and the high-bandwidth mode are operated on common hardware through software configuring the common hardware to operate in a logical configuration corresponding to one of the low-bandwidth mode and the high-bandwidth mode.

7. The method according to claim 6, wherein the first Clos switch and the composite Clos switch share a common backplane.

8. The method according to claim 6, wherein first and second set of ingress line modules comprise common hardware, the first and second set of switch modules comprise common hardware, and the first and second set of egress line module comprise common hardware.

9. The method according to claim 6, wherein the first and second set of ingress line modules further comprise a plurality of switching chips.

10. The method according to claim 9, wherein a number of switching chips is two.

11. The method according to claim 9, wherein a number of switching chips is one.

12. The method according to claim 6, wherein the first and second set of egress line modules further comprise a plurality of switching chips.

13. The method according to claim 12, wherein a number of switching chips is two.

14. The method according to claim 12, wherein a number of switching chips is one.

15. The method according to claim 8, wherein the first set of ingress line modules and the first set of egress line modules each contains eight common modules.

16. The method according to claim 15, wherein the second set of ingress modules and the second set of egress modules each contains twenty-four common modules.

17. The method according to claim 6 wherein the first set and second set of switch modules each contains four switching chips.

18. The method according to claim 6 wherein the first set and second set of switch modules each contains two switching chips.

19. The method according to claim 17 wherein the low bandwidth mode, all four switching chips are utilized in the first set of switch modules.

20. The method according to claim 17, wherein the high bandwidth mode, three switching chips are utilized in both the first and second set of switch modules.

21. The method according to claim 6, wherein the first and second set of switch modules each comprises four modules.

22. The method according to claim 6, wherein both low and high bandwidth modes operate using the same chassis and backplane.

23. An apparatus for a reconfigurable switch used in data communication, comprising:
a first plurality of ingress line modules, each of the first plurality of ingress line modules having a plurality of inputs and a first and second plurality of outputs;
a first plurality of switch modules, each of the first plurality of switch modules having a plurality of inputs and outputs comprising first logical links and first overlapping logical links, wherein, for operation in a first mode, each switch module input is respectively coupled to one of the first and one of the second plurality of outputs of each one of the first plurality of ingress line modules;
a first plurality of egress line modules, each of the first plurality of egress line modules having a plurality of outputs and a first and second plurality of inputs, wherein, for operation in the first mode, each switch module output is respectively coupled to one of the first and one of the second plurality of inputs of each one of the plurality of egress line modules;
a second plurality of ingress line modules for operation in a second mode, each of the second plurality of ingress line modules having a plurality of inputs and outputs;
a second plurality of switch modules for operation in a second mode, each of the second plurality of switch modules having a plurality of secondary inputs and secondary outputs comprising second logical links and second overlapping logical links, and an overlapping structure for interconnecting the first plurality of switch modules and the second plurality of switch modules to form a switch fabric which is a superset of the first and second plurality of switch modules, wherein the overlapping structure allows the first mode to operate with reduced aggregate bandwidth from the second mode, wherein each switch module secondary input is: 1) respectively coupled to one of the plurality of outputs of each one of the second plurality of ingress line modules, and 2) respectively coupled to one of the second plurality of outputs of each one of the first plurality of ingress line modules, and further wherein, for operation in the second mode,
each of the plurality of inputs of the first plurality of switch modules is respectively coupled to: 1) one of the plurality of outputs of each one of the second plurality of ingress line modules, and 2) one of the first plurality of outputs of each one of the first plurality of ingress line modules; and
a second plurality of egress line modules for operation in a second mode, each of the second plurality of egress line modules having a plurality of inputs and outputs, wherein each switch module secondary output is: 1) respectively coupled to one of the plurality of inputs of each one of the second plurality of egress line modules, and 2) respectively coupled to one of the second plurality of inputs of each one of the first plurality of egress line modules, and further wherein, for operation in the second mode,
each of the plurality of outputs of the first plurality of switch modules is respectively coupled to: 1) one of the plurality of outputs of each one of the second plurality of ingress line modules, and 2) one of the first plurality of outputs of each one of the first plurality of ingress line modules;

wherein each of the first and second plurality of switch modules comprise common hardware and wherein the first mode comprises a first set of hardware;

wherein the first mode and the second mode are operated on the common hardware through software configuring the common hardware to operate in a logical configuration corresponding to one of the first mode and the second mode;

wherein the overlapping structure comprises switching circuitry configured to provide the first and second overlapping logical links, wherein the switching circuitry is used only in the first mode;

wherein the second mode is achieved by adding a second set of hardware to the first set of hardware without impacting traffic on the first set of hardware and moving traffic from the first overlapping logical links to the second logical links on the second plurality of switch modules with minimal effect of traffic on the first plurality of ingress line modules, the first plurality of switch modules, and the first plurality of egress line modules;

wherein minimal effect comprises an in-service switch between the first plurality of switch modules and the second plurality of switch modules; and wherein the overlapping structure is not used in the second mode following upgrading by moving traffic.

24. A data-communications switch having a plurality modes of operation, comprising:

a plurality of interconnected Clos switches capable of operating in a corresponding plurality of different modes, overlapping logical links for interconnecting a first Clos switch with one or more of the remaining plurality of Clos switches to form a composite switch fabric which is a superset of the plurality of Clos switches, wherein the overlapping logical links allow the first of the corresponding plurality of different modes to operate with reduced aggregate bandwidth from the remaining corresponding plurality of different modes, and wherein the overlapping logical links are used only in the first of the corresponding plurality of different modes;

wherein the first of the corresponding plurality of different modes operates on a first set of hardware;

wherein the interconnecting of the first Clos switch with one or more of the remaining plurality of Clos switches is performed by adding one or more sets of hardware to the first set of hardware without impacting traffic on the first set of hardware and upgrading with minimal effect of traffic on the first Clos switch by moving traffic from the overlapping logical links to logical links on the one or more of the remaining plurality of Clos switches;

wherein minimal effect comprises an in-service switch between the first Clos switch and the one or more of the remaining plurality of Clos switches;

wherein the plurality of different modes are operated on common hardware through software configuring the common hardware to operate in a logical configuration corresponding to a specific mode of operation;

wherein the overlapping logical links are not used following upgrading by moving traffic.

* * * * *